United States Patent
Valentin et al.

(10) Patent No.: US 6,853,459 B2
(45) Date of Patent: Feb. 8, 2005

(54) SCANNING USING POSITION TRANSMISSION FOR TRIGGERING THE RECORDING OF MEASURED VALUES

(75) Inventors: Jürgen Valentin, Duisburg (DE); Marcus Grigat, Wesel (DE); Hans-Hermann Schreier, Oldenburg (DE)

(73) Assignee: NanoFocus AG, Oberhausen-Rhld (DE)

( * ) Notice: Subject to any disclaimer, the term of this patent is extended or adjusted under 35 U.S.C. 154(b) by 127 days.

(21) Appl. No.: 09/936,827

(22) PCT Filed: Jan. 11, 2001

(86) PCT No.: PCT/DE01/00089

§ 371 (c)(1),
(2), (4) Date: Sep. 18, 2001

(87) PCT Pub. No.: WO01/53775

PCT Pub. Date: Jul. 26, 2001

(65) Prior Publication Data

US 2002/0135782 A1 Sep. 26, 2002

(30) Foreign Application Priority Data

Jan. 18, 2000 (DE) .......................................... 100 01 800

(51) Int. Cl.[7] .......................... G01B 11/14; G01F 23/00
(52) U.S. Cl. ...................... 356/616; 356/603; 356/608; 356/612; 356/621; 356/622; 356/623; 250/559.23; 250/559.31

(58) Field of Search .......................... 356/616, 601–603, 356/608, 612, 614, 621–623; 250/559.22, 559.23, 559.29, 559.31

(56) References Cited

U.S. PATENT DOCUMENTS

| | | | |
|---|---|---|---|
| 4,705,395 A | * 11/1987 | Hageniers | 356/3.06 |
| 5,382,806 A | * 1/1995 | Bacchi et al. | 250/559.29 |
| 5,965,896 A | * 10/1999 | Marton | 250/559.4 |
| 5,995,227 A | * 11/1999 | Velzel et al. | 356/512 |
| 6,031,928 A | * 2/2000 | Scott | 382/108 |
| 6,345,107 B1 | * 2/2002 | Scott | 382/108 |
| 6,373,612 B1 | * 4/2002 | Hoffman et al. | 359/196 |
| 6,459,823 B2 | * 10/2002 | Altunbasak et al. | 382/299 |

FOREIGN PATENT DOCUMENTS

| | | |
|---|---|---|
| DE | 44 02 809 | 8/1994 |
| DE | 43 15 745 | 11/1994 |
| DE | 197 27 123 | 1/1999 |
| EP | 0 404 597 | 12/1990 |

* cited by examiner

Primary Examiner—Judy Nguyen
Assistant Examiner—Magda Cruz
(74) Attorney, Agent, or Firm—Collard & Roe, P.C.

(57) ABSTRACT

The start of the displacement movement is initiated by a software instruction when measuring surface topologies with microscopic resolution. Trigger pulses which serve to trigger the recording of measured values on the sensor are generated in discrete local intervals by a position transmitter. The measured values obtained are stored and then asynchronously transmitted to the controller.

13 Claims, 2 Drawing Sheets

Figure 1:
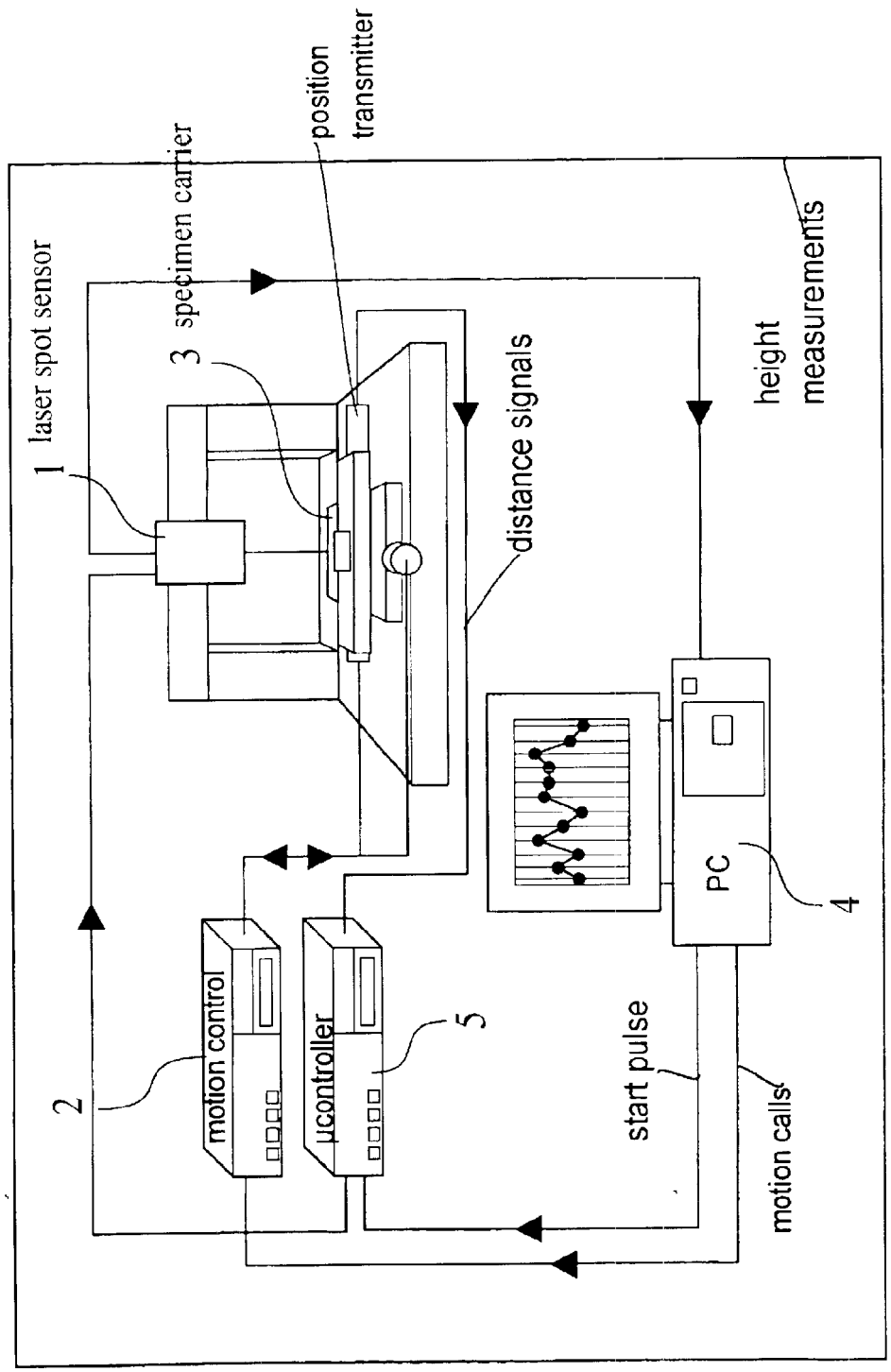

SCANNING USING POSITION TRANSMISSION FOR TRIGGERING THE RECORDING OF MEASURED VALUES

CROSS REFERENCE TO RELATED APPLICATIONS

Applicants claim priority under 35 U.S.C. §119 of German Application No. 100 01 800.9 filed Jan. 18, 2000. Applicants also claim priority under 35 U.S.C. §371 of PCT/DE01/00089 filed Jan. 11, 2001. The International Application under PCT article 21(2) was not published in English.

The invention relates to a method for measuring in particular surface topologies with microscopic resolution, in which a measuring sensor and a specimen to be detected are displaced in relation to one another in the x-y-directions, whereby the displacement movement is controlled by means of a controller recording the measured values measured by the sensor; whereby following the start of the sensor and the displacement movement, the sensor is read out at defined intervals, and individual detected profiles, the latter being displaced from each other with respect to position in a dimension extending perpendicular in relation to the direction of the profile, are assembled so as to form a measured surface area after the measurement has been completed.

The invention, furthermore, relates to a device for carrying out the method, comprising an interval sensor arranged above the surface of the specimen, and a carrier holding the specimen, said interval sensor and said specimen carrier being displaceable by a motor drive in relation to each other in the x-y directions; a control for the displacement movement; and a controller that is connected with the sensor for recording the values measured by the sensor, on the one hand, and the control for the displacement movement on the other.

Such surface-measuring devices serve for inspecting technical surfaces with microscopic resolution. Surface elevations can be measured in defined locations of a specimen in the course of inspection. The measuring device is additionally equipped with a precise coordinate control. The device is applied in all areas of micro-structure technologies.

The local resolution of the sensor is in the order of magnitude of 1 $\mu$m.

According to the state of the art, the table supporting the specimen is driven in a continuous motion between two sites for measuring the elevation profiles, whereby the sensor is read out simultaneously at defined time intervals.

The table and the sensor are started in this connection one shortly after the other via a software start signal. For measuring locally coherent areas in both dimensions, individual profiles that are locally displaced from one another on a dimension disposed perpendicular to the direction of the profile, are assembled so as to form a measured surface after the measurement has been completed.

The distances between adjacent measuring points dx of the profile measured in such a manner can be described as follows:

$$dx = v*dt.$$

With a displacement speed of "v" that is assumed to be constant, and with values measured at the time intervals dt, the location "x" of the i-th measuring point can later be determined as follows (the staring point is the reference point):

$$X(i) = i*dx.$$

The problems of said known method consist in that the start of the table and the sensor readout are afflicted with a time delay that is not constant. The cause thereof is that the table control and the sensor are controlled in terms of software by a controller, and that the controller employed is, as a rule, not a real-time system. This results in a local inaccuracy of the starting point.

Such local inaccuracy is proportional to the speed because of the time-related readout according to the above equation. Sensors that can be read out at a greater speed (i.e. at shorter time intervals) because of their high limit frequency permit a high displacement speed "v" with constant local resolution; however, the influence of the problems rises in connection therewith. Another difficulty lies in the non-constancy of the displacement speed "v".

According to the above equation, local inaccuracies will then occur. The cause of such inaccuracy is, among other things, the acceleration behavior of the table for reasons of mass inertia, and such behavior has to be taken into account on the part of the table control with an acceleration and braking ramp function.

Therefore, the invention is based on the problem of controlling a method of the type specified above in a manner such that the local accuracy is enhanced in the measurement of location-related measuring signals.

Said problem is solved by the invention according to the characterizing part of claim 13 in that the control of the displacement is prompted to start the displacement movement via a software instruction; trigger pulses transmitting the position are tapped at discrete and constant local intervals from the displaced element for the location-related readout of the sensor; that signals which, in turn, are location-related, are derived from the basic signals so obtained by means of electronic data processing, such location-related signals serving for triggering the recording of measured values of the sensor; and that the measured values so obtained are stored and then asynchronously transmitted to the controller.

In terms of the device, the problem is solved according to the characterizing part of claim 14 in that provision is made on the displaceable element for a position transmitter whose signals are converted into position-related, derived trigger signals by means of an interface connected upstream of the sensor and downstream of the displacement control, for triggering the recording of values measured by the sensor; and that the direction-dependent local increments are added up in a memory, whereby the detection of the direction is carried out by means of a program logic.

The problems addressed in the introduction to the specification are circumvented according to the invention in that only one starting signal is required for the displacement movement by interconnecting the sensor interfaces and tapping position signals.

According to the method as defined by the invention, the determined measured values can be read out asynchronously instead of the measured values supplied to the controller at defined time intervals.

The specimen is preferably arranged on a table that can be displaced in the x-y directions. However, it is conceivable also (according to claim 16) that the sensor is displaceable.

However, the invention is explained in the following on the example of the displaceable table as follows:

For tapping the trigger pulses transmitting the position, of which the position intervals are discrete and constant, provision is made on the table for an incremental angle encoder notably mounted on the respective axis of that motor with whose direction the displacement direction of the measured profile coincides.

As an alternative, it is possible also to mount an incremental or an absolutely measuring position transmitter directly on the table, preferably a so-called glass scale.

The basic signals (primary signals) received from the position transmitters are converted by means of electronic data processing into derived signals, which in turn are position-related. In particular a programmable microcontroller is employed for said purpose. Such a microcontroller may be a component of the table control as well. The derived signals serve for absolute (not only incremental) position determination.

Signals that are generated both by means of digital electronic circuit technology and also with the help of the programming of microprocessors from the input signals present in the form of digital signals can be interpreted as "derived" signals. For example, it is possible to carry out a digital division of the basic signal, so that only every nth pulse of a triggering operation triggers the signal of the measured value (with n>1). This enlarges the local interval in a defined manner.

In addition to a program logic, the data processing system also requires a memory logic because a summation of the direction-dependent local increments is required for absolute position determination. The recognition of the directions takes place within the programming logic.

Figure 2:
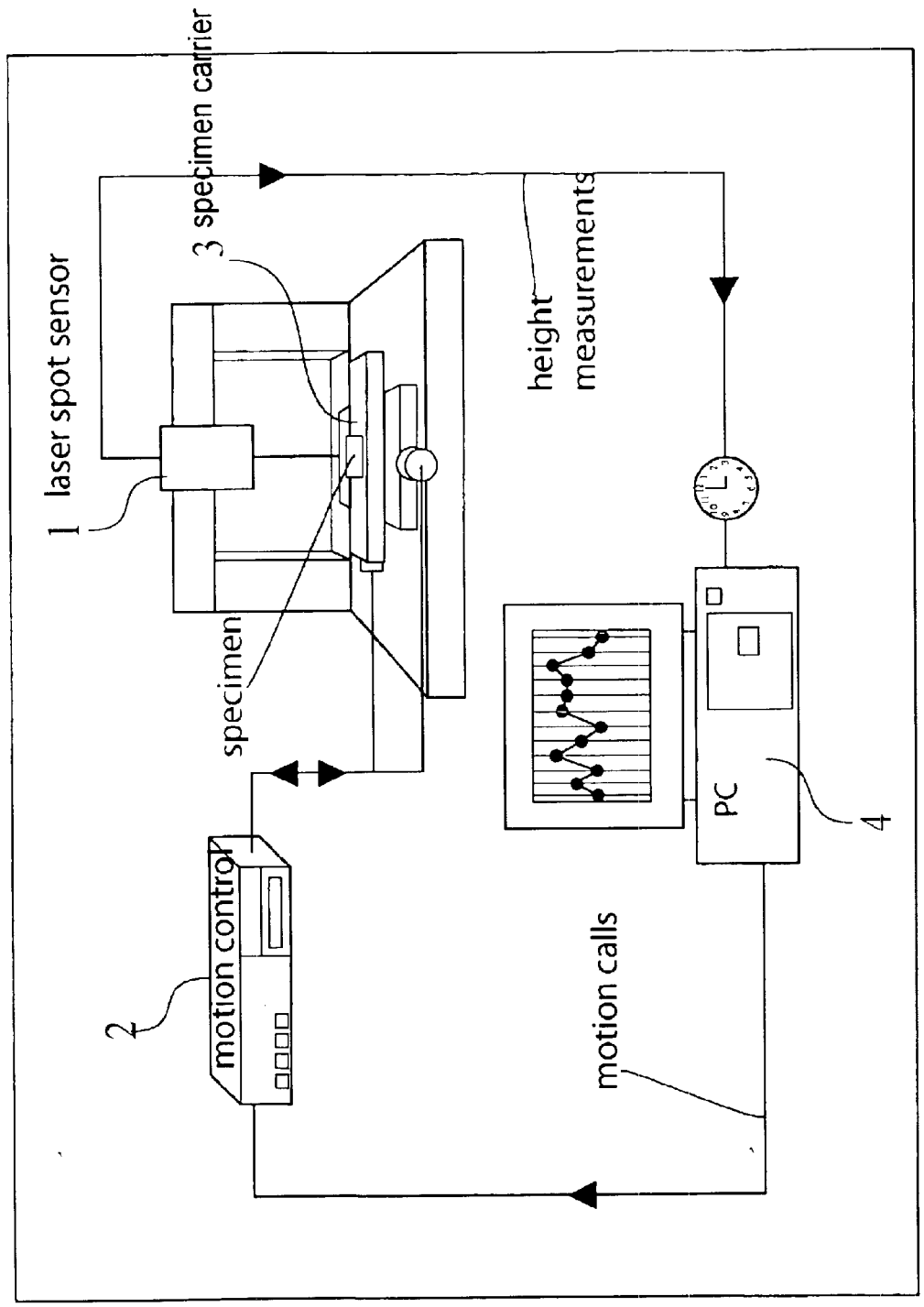

The invention is explained in the following with the help of drawings, in which:

FIG. 1 shows the schematic structure of the circuit of the surface-measuring device; and FIG. 2 shows a schematic circuit arrangement according to the state of the art.

The structure of a surface-measuring device according to the prior art is schematically shown in FIG. 2. It substantially comprises an interval sensor 1 (preferably a laser spot sensor), and a control 2 for the displacement movement in the x-y-directions of a displaceable table 3, on which a specimen to be detected is arranged. The sensor 1 is arranged above the specimen in a fixed manner. The table with the specimen arranged thereon is displaced in a continuous motion between two locations, whereby the sensor is read out at the same time at defined time intervals. The measured values are transmitted at defined time intervals to a controller 4 (a PC in most cases). The controller transmits a start signal to both the sensor 1 and the control 2. The table and the sensor are started in this way one shortly after the other.

At the displacement speed "v", which is assumed to be constant, the local interval can be allocated later to values measured at defined time intervals.

FIG. 1 shows the schematic structure of a surface-measuring device as defined by the invention. Said measuring device is substantially different from the known measuring device in that it comprises a sensor interface 5 interconnected between the control 2 and the sensor 1, and in that the controller 4 transmits a start signal only to the control.

Position signals are continually tapped on the table 3 (for example by means of an angle encoder or a glass scale arranged on the table 3) and transmitted to the interface 5 via the control. In said interface, the position signals (basic signals) are converted into derived signals that trigger the recording of measured values on the sensor. For this purpose, the interface 5 also comprises a memory logic in addition to the programming logic; in said memory logic, the direction-dependent local increments are added up for absolute position determination. The programming logic is required for recognizing the directions, among other things. The stored measured values are then asynchronously transmitted to the controller 4.

In this way (i.e. by means of absolute position determination with the help of the derived signal), the local accuracy of the measurement of position-related measured signals is substantially enhanced vis-à-vis the method represented in FIG. 2.

What is claimed is:

1. A method for measuring surface topologies with microscopic resolution comprising the following steps:

displacing a measuring sensor and a specimen in relation to each other, in x-y directions;

controlling the displacement of the specimen and sensor via a controller recording the x-y values of said sensor wherein the displacement control is initiated via software instruction to start the displacement movement;

reading said sensor at defined intervals after said sensor and displacement movement have been started;

tapping position transmitting trigger pulses in discrete and constant local intervals from the displacing element for position-related readout of said sensor;

combining a set of individual detected profiles which are locally offset from each other in a dimension extending perpendicular to the direction of the detected profiles wherein these profiles are combined to form a measured area after the measurement has been completed;

generating derived position related signals from basic signals via electronic data processing, wherein said derived position related signals are for triggering the recording of a set of measured values of the sensor;

storing said set of measured values; and asynchronously transmitting said set of measured values to said controller.

2. A device for carrying out the method as in claim 1, comprising:

a) an interval sensor arranged above a surface of the specimen;

b) a specimen carrier for carrying the specimen wherein said sensor and said specimen carrier are displacable elements which are displacable relative to each other;

c) a motor drive for displacing said interval sensor and said specimen carrier in a x-y direction;

d) a displacement control in communication with said motor drive for controlling the displacement movement;

e) a controller wherein said controller is connected with said interval sensor for recording the measured values of said interval sensor;

f) a position transmitter coupled to at least one of said displacable elements and in communication with said displacement control, for recording the position-giving trigger impulses, wherein said displacement control is for converting signals from said position transmitter; and g) an interface connected downstream of said displacement control for converting said signals from said displacement control into position-related, derived trigger signals for triggering the recording of values measured by said sensor, wherein said interface has a memory and a programming logic, wherein direction dependent local increments are added up in said memory, and a detection of direction takes place via said programming logic.

3. The device as in claim 2, wherein said specimen carrier is in the form of a table that is displacable in the x-y direction.

4. The device as in claim 2, wherein said sensor is displacable in x-y direction.

5. The device as in claim 2, further comprising an incremental angle encoder mounted on an axle of said motor, with a direction of said incremental angle encoder coinciding with a direction of displacement of said measuring profile, wherein said incremental angle encoder is for tapping position transmitting trigger pulses on said displacable elements.

6. The device as in claim 2, further comprising an incremental measuring position transmitter for tapping the position transmitting trigger pulses on said displacable elements.

7. The device as in claim 6, wherein said position transmitter is a glass scale which is used to balance out positioning inaccuracies.

8. The device as in claim 2, wherein said interface, for deriving a set of basic signals, comprises a programmable and storing microcontroller.

9. The device as in claim 2, wherein said displacable control further comprises a programmable and storing microcontroller.

10. The device as in claim 2, wherein said controller is a personal computer (pc).

11. The device as in claim 2, wherein said sensor is an optically operated sensor.

12. The device as in claim 11, wherein said sensor is a laser spot sensor.

13. A device for measuring surface topologies of a specimen with microscopic resolution, the device comprising:

a) a sensor arranged above a surface of the specimen;

b) a specimen carrier for carrying the specimen wherein said sensor and said specimen carrier are displacable elements which are displacable relative to each other;

c) a motor drive for displacing said sensor and said specimen carrier in a x-y direction;

d) an incremental angle encoder coupled to said motor drive;

e) a displacement control in communication with said motor drive for controlling the displacement movement;

f) a controller wherein said controller is connected with said sensor for recording the measured values of said sensor;

g) a position transmitter coupled to at least one of said displacable elements and in communication with said displacement control, for recording the position-giving trigger impulses, wherein said displacement control is for converting signals from said position transmitter; and h) an interface connected downstream of said displacement control for converting said signals from said displacement control into position-related, derived trigger signals for triggering the recording of values measured by said sensor, wherein said interface has a memory and a programming logic, wherein direction dependent local increments are added up in said memory, and a detection of direction takes place via said programming logic;

wherein the device is used to perform the following steps:

displacing said sensor and said specimen in relation to each other, in x-y directions;

controlling the displacement of said specimen and said sensor via said controller and said displacement control and recording the x-y values of said sensor wherein displacement control is initiated via software instruction from said controller to start the displacement movement;

reading said sensor at defined intervals after said sensor and displacement movement have been started;

tapping position transmitting trigger pulses in discrete and constant local intervals from said sensor by using said incremental angle encoder for position-related readout of said sensor;

combining in said interface a set of individual detected profiles which are locally offset from each other in a dimension extending perpendicular to the direction of the detected profiles wherein these profiles are combined to form a measured area after the measurement has been completed;

generating in said interface derived position related signals from basic signals via electronic data processing, wherein said derived position related signals are for triggering the recording of a set of measured values of said sensor;

storing said set of measured values; and asynchronously transmitting said set of measured values to said controller.

* * * * *